United States Patent
Corrigan

[15] 3,673,943
[45] July 4, 1972

[54] CAMERAS
[72] Inventor: Harry G. Corrigan, 258 Amalfi Drive, Los Angeles, Calif. 90402
[22] Filed: May 13, 1970
[21] Appl. No.: 36,857

[52] U.S. Cl. ..................................................95/24, 95/23
[51] Int. Cl. ......................................................G03b 19/10
[58] Field of Search.....................95/19, 23, 41, 12, 13, 14, 95/24

[56] References Cited

UNITED STATES PATENTS

| | | | |
|---|---|---|---|
| 819,403 | 5/1906 | Brooks et al. | 95/41 |
| 2,471,522 | 5/1949 | Garrett et al. | 95/19 |
| 2,923,221 | 2/1960 | Smith | 95/23 |
| 3,396,647 | 8/1968 | Downey | 95/19 X |
| 2,648,265 | 8/1953 | Candela | 95/24 X |
| 3,580,685 | 5/1971 | Eriksson | 95/24 X |

*Primary Examiner*—Samuel S. Matthews
*Assistant Examiner*—Richard E. Moses

[57] ABSTRACT

A camera in which the photographic emulsion for each single exposure is on a rigid plate in a light-proof but openable container. A removable magazine on the camera stores several of the emulsion containers. The camera contains mechanism for opening the container to permit exposure, re-closing and locking the container, and ejecting the locked container or transferring it to a storage magazine. Plates carrying the emulsion can be keyed for individual identification. When opened, the emulsion is held at the precise focal plane of the camera optical system.

1 Claim, 5 Drawing Figures

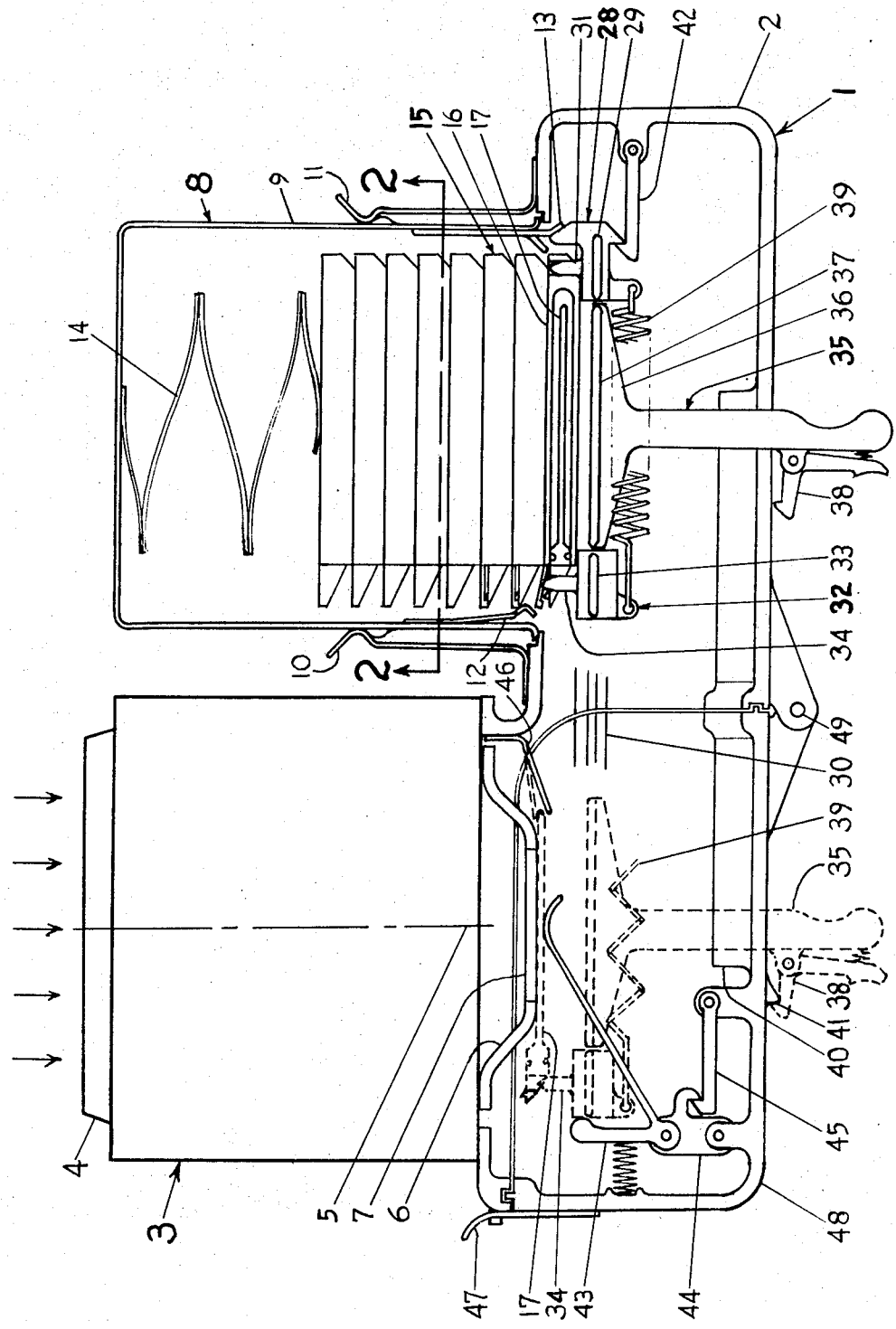

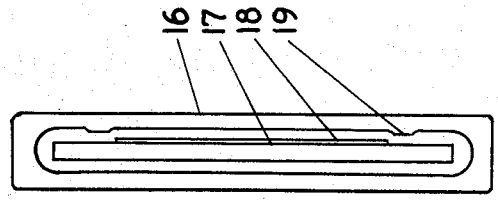
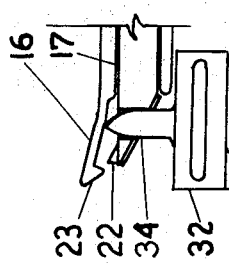
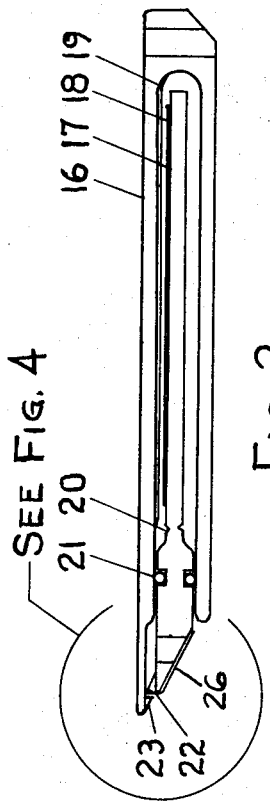
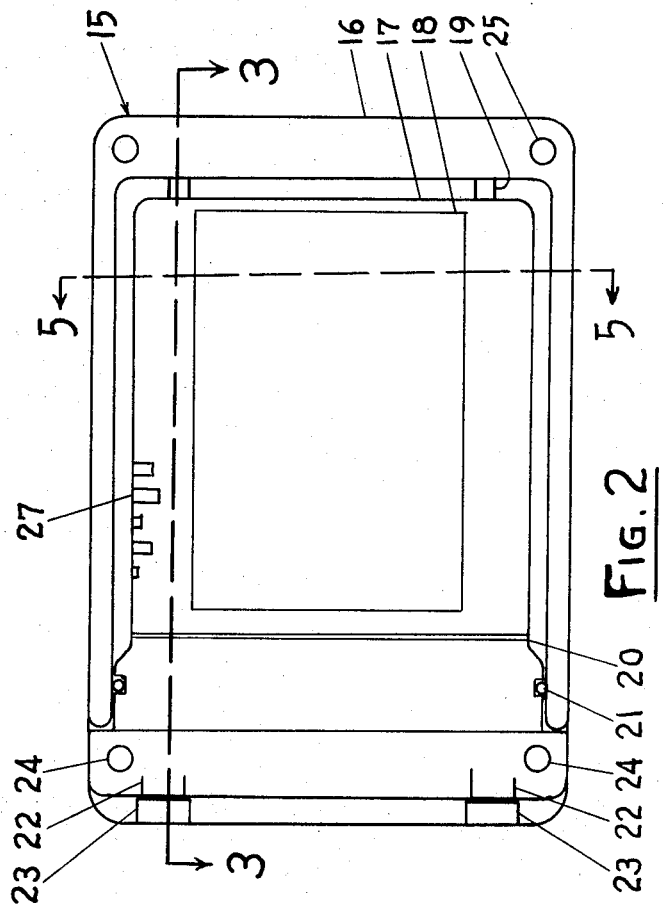

CAMERAS

SUMMARY OF THE INVENTION

This invention relates to cameras and specifically the method by which light-sensitive photographic emulsion is placed in position for optical exposure in the camera and removed after exposure.

Conventional cameras, particularly the "miniature" cameras, are arranged to contain a sufficient amount of photographic emulsion to take a series of exposures before the operator is required to remove the exposed emulsion and replace it with unexposed emulsion. To accomplish this, the emulsion is supported on a plastic film, and the mechanism of the camera moves the plastic film in such a way that the emulsion is moved from a storage area, into the exposure area of the camera optical system, then into another storage area. The plastic film usually contains enough emulsion for 8, 12, 20, or 36 exposures. All of the emulsion is of the same type, black-and-white, color, etc. and is on one continuous strip of the plastic film.

This known system for handling the photographic emulsion requires the complete strip of exposed film to be removed from the camera for processing by known developing and printing methods.

The known system requires the camera operator to complete the total number of exposures before he can have any one exposure processed, often forcing the operator to waste exposures to complete the film, or to wait for long periods of time before he can have his first exposure processed. One of the references cited, namely U.S. Pat. No. 3,391,625, discusses this problem.

The same wasteful situation arises if the operator wants to use the camera for color photography when he has a partially exposed black-and-white film in the camera.

Another objection to the known film system of supporting the emulsion is that the plastic film is not sufficiently rigid to support the emulsion in the exact focal plane of the camera's optical system to the degree of accuracy which the optical designer would like. Since the base film must be wound on small rollers and since scratches must be avoided, it is not possible to give a rigid and precise support to the film. Variations in ambient temperature and humidity add to the problem.

One known method of taking a single exposure, is to have the emulsion on a plate in a holder which has an opaque sheet in front of the emulsion. This holder is put into the lightproof camera and the opaque plate is manually removed for exposure and manually replaced after the exposure so that the holder can be removed from the camera. This known apparatus is complex and has never been successfully mechanized for rapid semi-automatic operation. Also, this known plate method does not hold the emulsion in the exact focal plane of the camera because there are many contacting surfaces in series and the slight tolerances of each surface are cumulative.

It is the object of this invention to avoid the above objections to the film handling features of known camera, and to permit the operator to remove each exposed section of emulsion separately, and to select for each single exposure the type of emulsion he desires for that one exposure, regardless of the prior or subsequent exposures; and to support the emulsion on a rigid plate in the exact focal plane of the camera's optical system.

This invention solves the problems of the known devices with regard to handling the photographic emulsion.

The camera operator detaches the empty magazine and loads it with one or more separate holder assemblies, each of which holders contains an area of photographic emulsion, of the type the operator desires to use at the time.

Note that while the usual holder will contain emulsion for one exposure only, in the case of stereoptical cameras, which take two exposures at once for depth effect, the single slide could have emulsion areas for the two exposures, and in certain special cameras several exposures are made onto one area of emulsion. These special cases are known but will be omitted from further discussion.

The loaded magazine is then inserted in the camera. Moving a handle to the proper position causes the retaining clip of the magazine to be retracted and one holder is ejected from the magazine into the camera. Holes in the holder fit over two sets of pins in the camera mechanism. One set of pins engages the holes in the rigid transparent slide which supports the emulsion, and the other set of pins engages the holes in the light-proof container with encloses the slide.

A return movement of the operating handle causes the pins which engage the slide with its emulsion to be pulled out of the container, which is restrained because the pins which engage it are locked, and the slide is placed in contact with a precision surface which matches the focal plane of the camera's optical system.

This precision surface contacts the side of the plate on which the emulsion is carried, so that even a variation in the thickness of the plate does not effect the precision with which the emulsion is held in the exact focal plane of the optical system.

The handle movement which moves the plate to the exposure position also cocks the shutter system of the camera, and extends a spring which is attached to the pins which engaged the holes in the container.

When the operator pushes the button which releases the shutter to allow the light for taking the picture to pass, the shutter also strikes a release which allows the spring to pull the container over the plate.

The holder is thus restored to its light-proof condition, with the plate which supports the exposed emulsion enclosed in the container.

The operator can now remove the holder manually, or mechanism can be provided to place the exposed holder into a separate storage magazine for later removal when several holders have been exposed.

The camera operator is free to remove the donor magazine at any time and either remove the holders not used, or to replace them with holders containing a different type of emulsion.

Novel features and advantages of the present invention will become apparent to one skilled in the art from a reading of the following description in conjunction with the accompanying drawings, wherein similar reference characters refer to similar parts. In the accompanying drawings a now preferred embodiment of the invention is shown by way of illustration and not by way of limitation.

In the drawings:

FIG. 1 is a cross-sectional view of a camera, with a donor magazine in place, and holder assemblies in place in the magazine.

FIG. 2 is a section along 2—2 of FIG. 1.

FIG. 3 is a section along 3—3 of FIG. 2.

FIG. 4 is a partial view of FIG. 3, shown in an operated condition.

FIG. 5 is a section along 5—5 of FIG. 2.

Note: the scale of FIGS. 2, 3, 4 and 5 is twice that of FIG. 1.

Referring now to the figures in detail, the camera proper is generally designated as 1, and is usually rectangular in shape.

The material could be cast metal with the various attachment points cast in, sheet metal with the attachment points being separate pieces fastened to the main body, an opaque plastic, a transparent plastic completely treated with an opaque covering, or any material which would be rigid and light-proof. The several openings in the main body (including its hinged portion) should be made light-proof by means of rubber seals, felt, velvet, or other known means, because the photo-sensitive emulsion is momentarily exposed inside the camera housing.

The camera 1 contains any one of various known optical systems (not shown) and any one of various known shutter systems (not shown) and various known accessories (not shown). Only the novel system for holding and transporting the photographic emulsion and those elements of the camera which are pertinent to this system are shown and designated.

Mounted to the camera body 2 in a rigid and light-proof manner is an optical package generally indicated as 3 which consists of any known optical system, shutter system, viewing system, and accessories. The objective lens 4 has arrows to indicate the direction of incident light which travels along the optical axis 5 to be directed into the camera body 2 at the point indicated. Rigidly attached to this known optical package 3 is a rigid framework 6 in which there is an aperature 7 which is large enough to transmit the light for the picture and whose outer surface is exactly and precisely the focal plane of the known optical package 3.

Attached to the camera body 2 is a magazine generally designated as 8 which consists of a shell 9 which is held to the camera body 2 by the spring clips 10 and 11. Deflection of these clips 10 and 11 permit the removal of magazine 8 from the camera body 2. Fastened to the inside of shell 9 are two spring clips 12 and 13 which prevent the follower spring 14 from ejecting any of the holder assemblies or cartridges generally designated 15. Deflection of the spring clip 13 will allow the follower spring 14 to force the holder assemblies 15 out of the magazine 8. All parts of this magazine 8 can be steel sheet, or possibly plastic.

The novel holder assembly 15 is the device which holds the photographic emulsion and is best described by reference to FIGS. 2, 3, 4, and 5. The quantity of holders 15 in the camera 1 can vary at any time from zero to the full capacity of the magazine 8, possibly as many as twenty, or more. As will be described later, these holders 15 are processed through the camera 1, and at any time the operator can remove the magazine 8 and insert additional holders 15, so there is no limit to the total number of holders involved.

Referring to the cross-sectional view FIG. 2, in which view the sheet 26 is omitted for clarity the holder assembly 15 consists of a container 16, into which plate or slide 17 is inserted. This slide 17 supports the actual emulsion 18 which contains the known photo-sensitive chemicals. Alternately, a piece of known photographic film can be attached to the slide 17. The area covered by the emulsion is best shown in FIG. 2. Guard rails 19 are part of the container 16 and are located so that they would contact the slide 17 outside the area of the emulsion 18 to prevent scratching of the emulsion 18. A notch 20 is provided in slide 17 so that the portion carrying the emulsion 18 can be broken off to facilitate the chemical and mechanical processing of the emulsion 18, by known processes.

The container 16 is made of rigid and opaque material. The slide 17 is made of a rigid and transparent material in the area covered by the emulsion 18 and light-proof paint (not shown) is used to coat all other surfaces, or at least those surfaces which are outside of container 16. Alternately slide 16 can be made of two materials, one opaque and one transparent, or the external areas can be saturated with an opaque dye. A seal 21 is provided which will prevent light from reaching the emulsion while the slide 17 is in the container 16. This seal 21 could be a known rubber ring, an application of known flocking, or of velvet, basic idea being that a light-proof joint be made between slide 17 and container 16, and yet the two parts can be separated by a small force, less than one pound. Means are provided to lock the slide 17 into the container 16. One way to do this would be to provide lips 22 on the slide 17 and hooks 23 on the container 16. These would engage as shown in FIG. 3. FIG. 4 shows how the extension on the container 16 which carries the hooks 23 would be pushed aside by the pin 34 (described in detail later) going through the hole 24 in the slide 17. Movement of this pin 34 would then extract the slide 17 from the container 16. The container 16 would be prevented from moving by pins in the holes 25. FIG. 5 shows that the inside cavity of container 16 has a rounded surface to facilitate light-proofing.

Optional features of the holder assembly 15 would be to apply a sheet 26 over the holes 24 in the slide 17, to use as a nameplate. Also, since the pins 34 would punch holes in this sheet when they entered the holes 24 to cause the extraction of the slide 17, the holes in this sheet would serve as indication that the emulsion 18 had been exposed. This sheet 26 could be paper, plastic, or metal foil.

As another option, holes or notches 27 could be cut into the slide 17 in varying depths to key the slide 17 for identification.

As shown in FIG. 1 there is a retainer 28 which is guided in the camera body 2 by having protruding guides 29 which travel in straight slots 30, one on each side of the camera body 2, extending its full length, at the position where it is partially shown, and which carries retainer pins 31. There is an extractor 32 which also has guides 33 which travel in the slots 30 and has extractor pins 34. Between the retainer 28 and the extractor 32 is a handle assembly 35 consisting of a handle 36, guides 37 which travel in slots 30, and a latch 38.

A contractive spring 39 is attached to retainer 28 and extractor 32 and urges them together except as separated by handle assembly 35.

When the handle assembly 35 is in the position shown in solid lines, the retainer 28 deflects a spring clip 13 and permits the follower spring 14 to force one of the holder assemblies 15 out of the magazine 8 in such a manner that the holes 25 of the container 16 engage the retainer pins 31 and the holes 24 of the slide 17 engage the extractor pins 34.

Subsequently placing the handle assembly 35 in the position shown by the dotted lines by moving it along a light-sealing slot 40 to its end which acts as a positioning stop and engaging its latch 38 with a lip 41, on the camera body 2, extends a spring 39 and extracts the slide 17 from container 16. The container 16 is restrained by the retainer pins 31 since the retainer 28 is restrained by a hook 42. As shown in FIG. 4, the extractor pins 34 are long enough to deflect the hook 23 of the container 16 so that this hook 23 no longer engages the lip 22 of the slide 17.

When the handle assembly 35 has reached the position shown by the dotted lines it will have driven the extractor 32 into contact with the shorter leg of a pressure arm 43, which pressure arm 43 pivots about its supporting point on a link 44 since this link 44 is restrained by a hook 45. Rotation of this pressure arm 43 causes its longer leg, which is flexible, to move the slide 17 into intimate contact with the framework 6 which defines the focal plane of the optical system 3 of the camera 1. It will be noticed that the same face of the slide 17 which bears the photographic emulsion 18 is the face that is in contact with the precision framework 6 and that there are no intervening parts whose manufacturing tolerances could effect the precision with which the emulsion 18 is located in the focal plane of the optical system 3.

The shutter system, not shown, of the camera's optical system 3, is so adapted that after it has operated to permit light to complete the photographic exposure of the emulsion 18, it will then operate to release the hook 42 holding the retainer 28 and to release the hook 45 holding the link 44. supporting the pressure arm 43.

Releasing the hook 45 which holds the link 44 relaxes the pressure arm 43 and allows a spring 46 to move the slide 17 away from the precision framework 6.

When the shutter mechanism, not shown, releases the hook 42 holding the retainer 28, the spring 39 between the retainer 28 and the extractor 32 draws the retainer 28 and its pins 31 toward the extractor 32 since the extractor 32 is held in position by the latched handle 35. The pins 31 on the retainer 28 carry the container with them and a spring 46 so locates the edge of the slide 17 that the container 16 slips over the slide 17 and the hook 23 on the container 16 engages the lip 22 on the slide 17 to lock them together, forming a light-proof and locked holder assembly 15 with the photographically exposed emulsion 18 inside.

Releasing its latch 47 allows a hinged portion 48 of the camera body 2 to be rotated about a pivot 49, thus providing access for removal of the holder assembly 15 which contains the exposed emulsion 18. Re-closing this hinged portion 48 of the camera body 2 renders the camera 1 light-proof for the taking of the next picture.

As for the materials which are suitable for the construction of the various components of this invention, all of those parts which are called springs, and identified with the numbers 10, 11, 12, 13, 14, 39, and 46 would properly be made of spring steel. All other parts, except as specifically mentioned where they are first described, could be any rigid metal such as steel, aluminum, brass, or bronze, or a rigid plastic. The lip of the container 16 as shown in FIG. 4 must be capable of deflection to unlock and must have sufficient resiliency to relock.

While the invention has been described in detail with respect to a certain now preferred example and embodiment of the invention, it will be understood by those skilled in the art after understanding the invention that various changes and modifications may be made without departing from the spirit and scope of the invention and it is intended therefore to cover all such changes and modifications in the appended claims.

What is claimed as new and desired to be secured by Letters Patent is:

1. A camera adapted to the precision photographic exposure of film embodied therein and delivering each single exposure of said film mounted on a rigid transparent plate and enclosed in a separate light-proof but openable container, said camera having as one of its components a magazine mounted in a detachable but light-sealing manner, which magazine contains a plurality of flat rectangular cartridges, said magazine containing a spring which resiliently urges said cartridges against a releasable lock at the open or attachment end of said magazine, each of which cartridges consists of two parts, the external part being a light-proof container, marked as to the type of film enclosed, enclosing on five sides the internal part which is a rigid and transparent plate, which plate has an opaque enlargement on one edge, attached in a frangible manner, which enlargement engages with said container to form the sixth side for a complete light-proof cartridge assembly, and which enlargement has protrusions to form a releasable lock holding the plate into the container, said plate having an area of photographic film sufficient for one picture applied to one face of it, said plate extending beyond said film area for a sufficient distance to permit the camera mechanism to handle the plate without touching the film and to permit the edges of the plate to be notched in a coded manner for identification, the external container being pierced by a hole in each of the two corners of its edge which is opposite to its open edge but in such a manner as to maintain the light-proof nature of the container, and the enlargement on the edge of the internal slide also being pierced by a hole in each of the two corners of its enlargement edge, which camera also contains within its light-sealed body a two-piece separable carriage guided by grooves inside the body of the camera, one piece of which having a protrusion which is adapted to release one of the aforesaid cartridges from the magazine and having two pins which are adapted to engage the aforesaid holes in the container portion of said cartridge and to restrain the container, the second piece of the carriage having two pins which are adapted to engage the aforesaid holes in the plate in such a manner as to release the locking device which normally holds the plate into the container and this second part of said carriage being adapted to be moved by an operating handle, which handle penetrates the body of the camera in a light-proof manner, in such a way that the plate is extracted from the container and the plate is moved to a position against a stop which locates the center of the photographic film on the plate coincident with the centerline of the optical system of the camera and locates the film-bearing face of the plate in contact with two rails which are at the exact plane of focus of the camera's optical system, said camera also containing within its light-proof body a resilient arm which is adapted to urge the film-bearing plate against the aforesaid rails whose outer surface coincides with the camera's optical plane of focus, the shutter mechanism of the camera being so adapted that upon the completion of its operation of permitting light to fall upon the film it releases the said resilient arm and releases the catch which restrains the first section of the carriage and allows a spring which contractively connects the two sections of the carriage to draw the first section of the carriage across to the second section of the carriage and in so doing to carry the container portion of the cartridge assembly, by means of the aforesaid pins which engage the aforesaid holes in said container, back around the plate to restore the light-proof nature of the cartridge and to re-close its locking device, said camera also having a light-sealing access door of such size and location that access can be gained to the inside of the body of the camera sufficient to permit the removal of the cartridge whose film has been photographically exposed, said access door being re-closeable to render the body of the camera light-proof.

* * * * *

UNITED STATES PATENT OFFICE
CERTIFICATE OF CORRECTION

Patent No. 3,673,943          Dated July 4, 1972

Inventor(s) Harry G. Corrigan

It is certified that error appears in the above-identified patent and that said Letters Patent are hereby corrected as shown below:

On the cover sheet [72] "258 Amalfi Drive, Los Angeles, Calif. 90402" should read -- 1827 Campton St. Ely, Nevada 89301 --.

Signed and sealed this 1st day of May 1973.

(SEAL)
Attest:

EDWARD M. FLETCHER, JR.           ROBERT GOTTSCHALK
Attesting Officer          Commissioner of Patents